A. A. KENT.
ELECTRIC METER.
APPLICATION FILED JAN. 14, 1907.

1,019,163. Patented Mar. 5, 1912.

WITNESSES:

INVENTOR
Arthur Atwater Kent
BY
Charles N. Butler
ATTORNEY.

UNITED STATES PATENT OFFICE.

ARTHUR ATWATER KENT, OF PHILADELPHIA, PENNSYLVANIA.

ELECTRIC METER.

1,019,163.

Specification of Letters Patent. Patented Mar. 5, 1912.

Application filed January 14, 1907. Serial No. 352,083.

*To all whom it may concern:*

Be it known that I, ARTHUR ATWATER KENT, a citizen of the United States, residing in the city of Philadelphia, county of Philadelphia, and State of Pennsylvania, have invented certain Improvements in Electric Meters, of which the following is a specification.

This invention is an electric meter comprising an indicator with means for damping its action, an adjustable permanent magnet for bringing the indicator to the initial position, and electro-magnetic mechanism excited by the current to be measured and actuating the indicator in proportion thereto, the electro-magnetic mechanism having poles symmetrically placed with reference to the field of force of the permanent magnet to provide distinct magnetic influences upon the respective poles of the armature, to secure a more uniform action of the indicating mechanism and so that the electro-magnetic action will not injuriously affect the permanent magnet.

Figure 1:
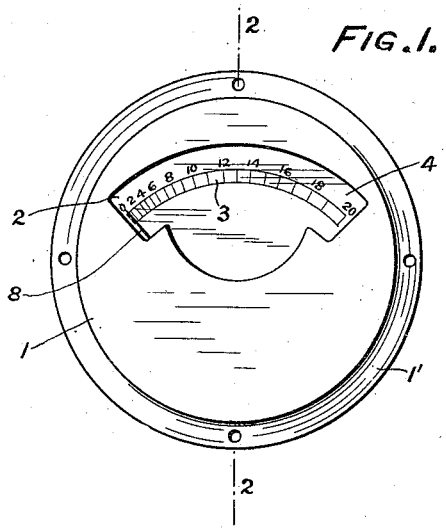
Figure 2:
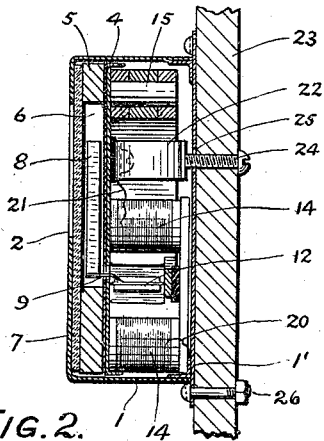
Figure 3:
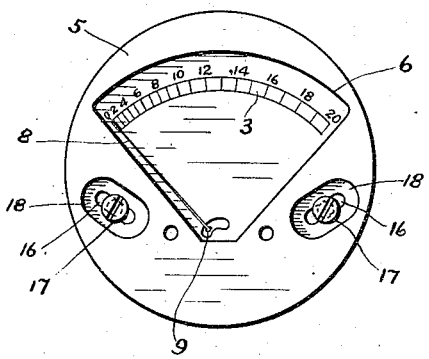
Figure 4:
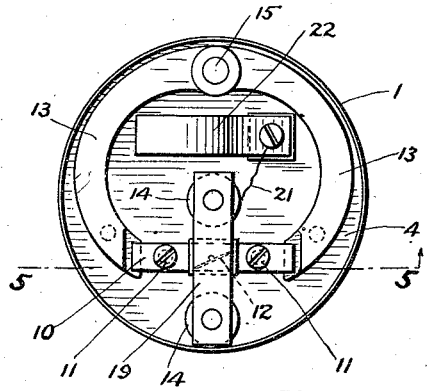
Figure 5:
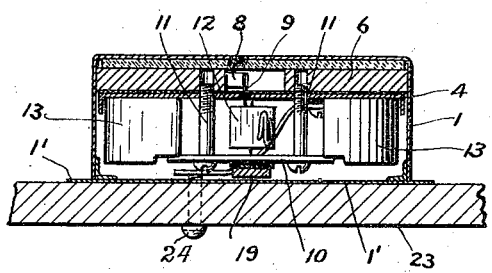

In the accompanying drawings, Figure 1 is a face view of a meter embodying my improvements, Fig. 2 is a sectional view taken on the line 2—2 of Fig. 1; Fig. 3 is a face view with the casing removed; Fig. 4 is a back view showing the interior construction, and Fig. 5 is a sectional view taken on the line 5—5 of Fig. 4.

The meter has the metal casing 1 with the sight opening 2 through which are viewed the graduations 3 on the dial plate 4. A card board or fiber disk 5 containing the sectoral opening 6 is placed over the dial plate and the glass disk 7 is placed over the disk 5 so that the graduated arc 3 can be viewed through the glass and opening. An indicator 8, consisting of a comparatively broad and thin strip of material, is fixed to an arbor 9 and has its broad surfaces disposed vertically with relation to the dial plate so that it can oscillate in the chamber formed by the opening 6 over the graduated arc 3, and since the width of the broad surfaces of the indicator is but slightly less than the depth of the chamber in which it swings the oscillations of the indicator are dampened by reason of the resistance of the air in the chamber upon the broad surfaces of the indicator. The arbor 9, having pivotal bearings on the plate 4 and the bar 10 of any suitable non-magnetic material which bar is connected to the plate by the screws 11, has the metal vane or armature 12 fixed thereto and disposed in the intersecting fields of force of the permanent horseshoe magnet 13 and the pair of electro-magnets 14, the latter lying on either side of the lines of force between the poles of the former. The permanent magnet has the hinge 15 permitting its poles to be adjusted with relation to each other in order to exert the degree of force upon the plate or vane 12 requisite for adjusting the action of the permanent magnet upon the armature and the consequent action of the indicator.

To hold the poles in the desired position, slots 16 are formed in the plate 4, through which screws 17 are passed into the pole pieces, the disk 5 being provided with the elongated countersinks 18 to permit the heads of the screws to lie below the surface of this disk. The cores of the electro-magnets are connected by a yoke 19, disposed transversely to the bar 10. The terminal wire 20 of the electro-magnets is electrically connected to the casing and the other terminal 21 is connected to a spring contact 22 fixed to and insulated from the plate 4. The casing has a detachable back 1' which is fastened upon an insulating support 23, as the dash-board of an automobile, in which is set a contact or binding screw 24, the screw passing through a hole 25 in the bottom of the casing into contact with the spring 22. A screw 26 passing through the bottom of the casing and the dash board provides means for making electrical contact and completing the circuit from the screw 24 through the meter.

It will be understood that upon electrically connecting the meter in circuit through the conducts 24 and 26, the lines of force passing between the poles of the now excited electro-magnets will act upon the armature 12 to turn it from alinement with the poles of the electro-magnet through an arc depending upon the strength of the current, the latter being indicated by the corresponding movement of the indicator 8 over the scale 3.

As the pair of electro-magnets are placed so that they will act equally upon the poles of the permanent magnet, the latter is not injuriously affected as in the case of the use of a single electro-magnet, which, by reason of its dissimilar actions upon the poles of the permanent magnet, tend to demagnetize it.

Having described my invention, I claim:—

1. In an electric meter a combination with a casing provided with two compartments, an armature and means to deflect the same in accordance with the current passing through said meter, both armature and deflecting means being located in one compartment, of an indicator connected to said armature and mounted in the second of said compartments, said second compartment comprising an air chamber, the depth of which being substantially the same as the width of said indicator but permitting said indicator to move without actual engagement with the walls of said chamber.

2. A meter comprising a permanent magnet, a pivoted indicator having a wide surface throughout its length transverse to the path of movement of said indicator, a closed chamber in which said indicator is arranged to swing, an armature on which said indicator is mounted, magnetic means to normally hold said armature in one position, and electro-magnetic means to deflect said armature and the indicator carried thereby, the depth of said chamber being substantially the same as the width of said indicator to provide a dampener for said indicator.

3. A meter comprising a casing, a permanent magnet therein, electro-magnetic mechanism in said casing, and a contact spring in circuit with said electro-magnetic mechanism, said casing having a back with an opening through which contact may be made with said spring.

4. In an electric meter the combination with a casing provided with two compartments, of an armature and means to deflect the same in accordance with the current passing through said meter, both arranged in one of said compartments, and an indicator actuated by the said armature to swing pivotally in the second of said compartments, said second compartment having an arc-shaped wall near the end of said indicator, the said indicator being widened throughout its length and of substantially the same width as the depth of said chamber but out of contact with the walls of said chamber to permit the indicator to swing without engaging the walls of said chamber.

5. In an electric meter a combination of the armature, means to deflect said armature in accordance with the current passing through said meter, and an indicator connected to said armature and arranged to swing about a pivot, and a closed sector-shaped chamber in which said indicator is mounted with its pivot at about the apex of said chamber, the width of said indicator transverse to the path of its movement, being substantially the same as the depth of said chamber.

6. In an electric meter a combination of an armature, means to deflect said armature in accordance with the current passing through said meter, an indicator connected to said armature and arranged to swing about a pivot, and a closed sector-shaped chamber in which said indicator is mounted with its pivot at about the apex of said chamber, the width of said indicator transverse to the direction of its movement, being substantially the same as the depth of said chamber, and the free end of said indicator being adjacent the arc-shaped wall of said chamber.

7. A meter comprising a permanent magnet, a pivoted indicator having a wide surface throughout its length transverse to the path of movement of said indicator, an air chamber in which said indicator is arranged to swing, an armature on which said indicator is mounted, magnetic means to normally hold said armature in one position, and electro-magnetic means to deflect said armature and the indicator carried thereby, the depth of said chamber being substantially the same as the width of said indicator to provide a dampener for said indicator.

In testimony whereof I have hereunto set my name this 11th day of January, 1907, in the presence of the subscribing witnesses.

ARTHUR ATWATER KENT.

Witnesses:
Jos. G. Denny, Jr.,
Robert James Earley.

---

Copies of this patent may be obtained for five cents each, by addressing the "Commissioner of Patents, Washington, D. C."